(12) United States Patent
Matsuno et al.

(10) Patent No.: US 10,120,400 B2
(45) Date of Patent: Nov. 6, 2018

(54) AIR-CONDITIONING APPARATUS AND REMOTE CONTROLLER POWER SUPPLY METHOD

(71) Applicant: Mitsubishi Electric Corporation, Tokyo (JP)

(72) Inventors: Souichirou Matsuno, Tokyo (JP); Yuuichi Nishi, Tokyo (JP); Tomoaki Kobata, Tokyo (JP); Akihisa Maekita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 246 days.

(21) Appl. No.: 15/033,191

(22) PCT Filed: Dec. 18, 2013

(86) PCT No.: PCT/JP2013/007437
§ 371 (c)(1),
(2) Date: Apr. 29, 2016

(87) PCT Pub. No.: WO2015/092831
PCT Pub. Date: Jun. 25, 2015

(65) Prior Publication Data
US 2016/0265799 A1    Sep. 15, 2016

(51) Int. Cl.
*G05F 1/66*      (2006.01)
*F24F 11/62*     (2018.01)
(Continued)

(52) U.S. Cl.
CPC ............. *G05F 1/66* (2013.01); *F24F 11/30* (2018.01); *F24F 11/62* (2018.01); *G05B 15/02* (2013.01); *F24F 11/54* (2018.01); *F24F 11/56* (2018.01)

(58) Field of Classification Search
None
See application file for complete search history.

(56) References Cited

U.S. PATENT DOCUMENTS

| 5,592,824 A | 1/1997 | Sogabe et al. |
| 2012/0017619 A1* | 1/2012 | Yabuta ................. F24F 11/0009 62/129 |
| 2013/0325191 A1* | 12/2013 | Mukai .................... G05B 13/02 700/276 |

FOREIGN PATENT DOCUMENTS

| JP | 07-055238 A | 3/1995 |
| JP | 09-133395 A | 5/1997 |

(Continued)

OTHER PUBLICATIONS

Extended European Search Report dated Jul. 21, 2017 issued in corresponding EP patent application No. 13899476.9.
(Continued)

*Primary Examiner* — Whitney Moore
(74) *Attorney, Agent, or Firm* — Posz Law Group, PLC

(57) ABSTRACT

A remote controller power supply method for an air-conditioning apparatus, configured to control a plurality of indoor units divided into groups with different remote controllers, is provided that allows exclusion of a supply current monitoring circuit from a circuit board of the indoor units. In the air-conditioning apparatus including an outdoor unit and the plurality of indoor units, the plurality of indoor units are divided into two or more groups, and the indoor units in each of the groups are connected to a different remote controller. The indoor units are each allocated with an address having a ranking given according to a predetermined rule, and the outdoor unit instructs the indoor unit having the address of a first rank, out of the plurality of indoor units in each of the groups, to supply power to the remote controller.

7 Claims, 3 Drawing Sheets

(51) Int. Cl.
     *F24F 11/30*      (2018.01)
     *G05B 15/02*      (2006.01)
     *F24F 11/56*      (2018.01)
     *F24F 11/54*      (2018.01)

(56) References Cited

FOREIGN PATENT DOCUMENTS

| JP | 3364925 B2 | 1/2003 |
| JP | 2007-218453 A | 8/2007 |

OTHER PUBLICATIONS

International Search Report of the International Searching Authority dated Jan. 7, 2014 for the corresponding international application No. PCT/JP2013/076128 (and English translation).

* cited by examiner

AIR-CONDITIONING APPARATUS AND REMOTE CONTROLLER POWER SUPPLY METHOD

CROSS REFERENCE TO RELATED APPLICATION

This application is a U.S. national stage application of International Application No. PCT/JP2013/007437 filed on Dec. 18, 2013, the disclosure of which is incorporated herein by reference.

TECHNICAL FIELD

The present invention relates to an air-conditioning apparatus including a plurality of indoor units controlled by one or a plurality of remote controllers, and a method of supplying power to the remote controller.

BACKGROUND ART

When conventional air-conditioning apparatuses are installed, switching works and connector replacements have to be performed, to transmit data between the air-conditioning apparatus and a remote controller and supply power from the air-conditioning apparatus to the remote controller through the same transmission line (power signal line). Accordingly, the wire routing work at the installation site is troublesome, for example because a three-wire code has to be used exclusively for the remote controller, and a sufficient degree of freedom in performing the wire routing is unable to be secured, which may lead to a wrong routing operation.

To cope with such a drawback of the conventional air-conditioning apparatus, an address is allocated to an indoor unit of the air-conditioning apparatus, to supply power to the remote controller from the indoor unit having a specific address (see, for example, Patent Literature 1).

The mentioned arrangement eliminates the need to set up the power supply and employ the signal line for the power supply line, thereby simplifying the wire routing work and making the air-conditioning apparatus more reliable.

CITATION LIST

Patent Literature

Patent Literature 1: Japanese Unexamined Patent Application Publication No. 9-133395

SUMMARY OF INVENTION

Technical Problem

On the other hand, with the foregoing air-conditioning apparatus, a circuit that monitors the supply current to the remote controller has to be implemented in the control circuit board of each of the indoor units. However, since the circuit board of only one of the indoor units is used for supplying power to the remote controller, the supply current monitoring circuits in the circuit board of other indoor units that do not supply power to the remote controller turn out to be unnecessary, which impedes the reduction in manufacturing cost.

The present invention has been accomplished to solve the foregoing problem, and provides an air-conditioning apparatus and a remote controller power supply method that allow the supply current monitoring circuit to be excluded from the circuit board of each of the indoor units.

Solution to Problem

In an aspect, the present invention provides an air-conditioning apparatus including an outdoor unit, a plurality of indoor units connected to the outdoor unit via a first signal line, and at least one remote controller connected to the plurality of indoor units via a second signal line. The plurality of indoor units each include a remote controller power supply unit that supplies power to the remote controller.

The plurality of indoor units are divided into two or more groups, and one or more of the indoor units in each of the groups are connected to a different remote controller.

The plurality of indoor units are each allocated with an address having a ranking given according to a predetermined rule.

The outdoor unit instructs the indoor unit having the address of a first rank, out of the plurality of indoor units in each of the groups, to supply power to the remote controller.

In another aspect, the present invention provides a remote controller power supply method for an air-conditioning apparatus including an outdoor unit, a plurality of indoor units connected to the outdoor unit via a first signal line, and at least one remote controller connected to the plurality of indoor units via a second signal line.

The plurality of indoor units each include a remote controller power supply unit that supplies power to the remote controller.

The plurality of indoor units are divided into two or more groups, and one or more of the indoor units in each of the groups are connected to a different remote controller.

The remote controller power supply method includes allocating an address having a ranking given according to a predetermined rule to each of the plurality of indoor units, and causing the outdoor unit to instruct the indoor unit having the address of a first rank, out of the plurality of indoor units in each of the groups, to supply power to the remote controller.

Advantageous Effects of Invention

The method according to the present invention causes the outdoor unit to instruct only the indoor unit having the address of the first rank, out of the indoor units in each of the groups, to supply power to the remote controller. Therefore, the supply current monitoring circuit can be excluded from the indoor units, and consequently the manufacturing cost of the air-conditioning apparatus can be reduced.

DESCRIPTION OF EMBODIMENTS

Hereafter, an air-conditioning apparatus and a remote controller power supply method according to Embodiments of the present invention will be described with reference to the drawings.

Embodiment 1

Figure 1:
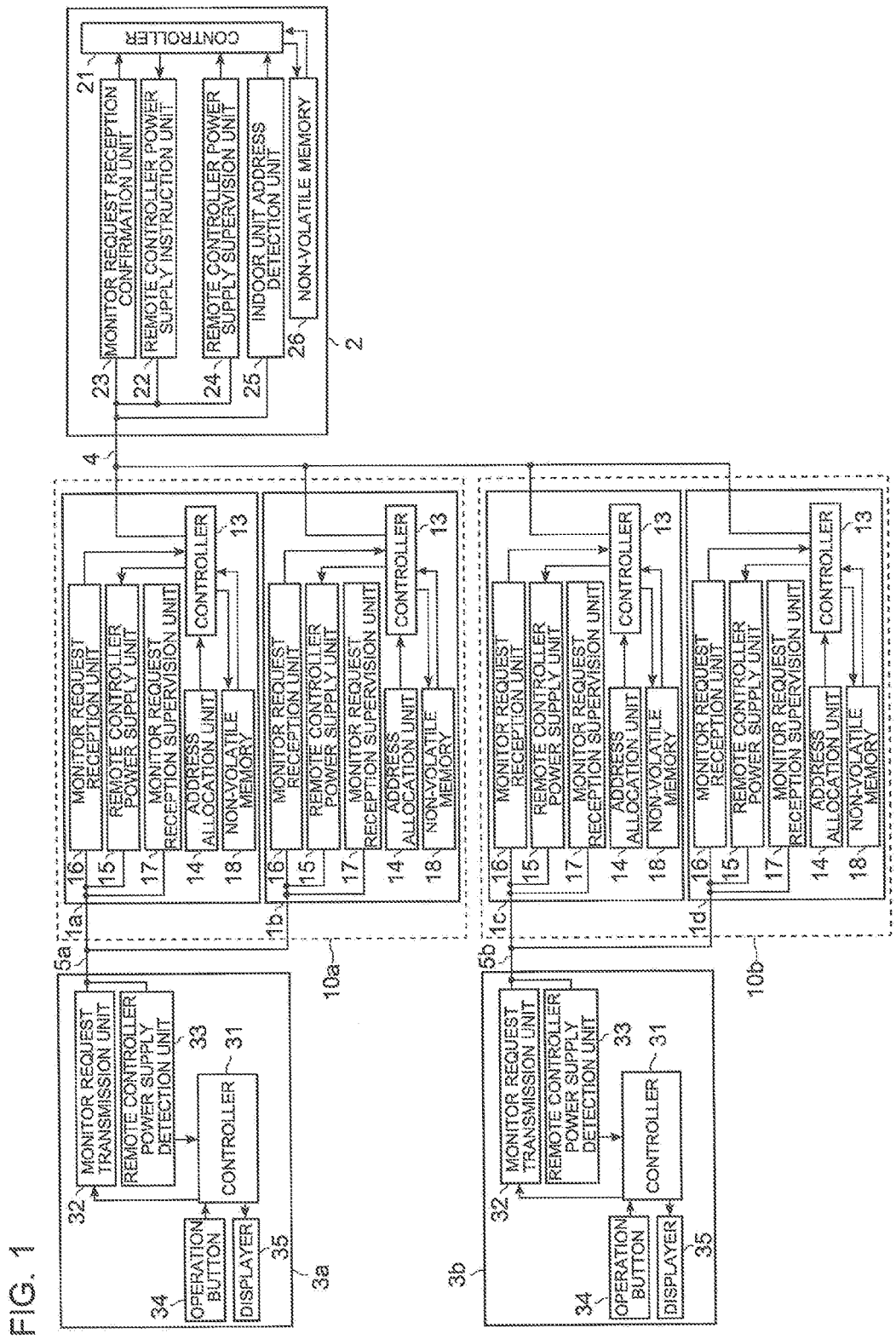
FIG. 1 is a block diagram showing a configuration of an air-conditioning apparatus according to Embodiment 1 of the present invention.

FIG. 1 is a block diagram showing a configuration of an air-conditioning apparatus according to Embodiment 1. The air-conditioning apparatus according to Embodiment 1 includes four indoor units $1a$ to $1d$ (hereinafter, collectively "indoor unit 1" as the case may be) and an outdoor unit 2, and the indoor units 1 and the outdoor unit 2 are connected to each other via a signal line 4.

The indoor units $1a$ to $1d$ are divided into two groups, which are a group $10a$ including the indoor units $1a$ and $1b$ and a group $10b$ including the indoor units $1c$ and $1d$. Remote controllers $3a$ and $3b$ (hereinafter, collectively "remote controller 3" as the case may be) for controlling the operation and displaying the operation status are connected to the groups $10a$ and $10b$ via signal lines $5a$ and $5b$, respectively.

The indoor units $1a$ to $1d$ and the outdoor unit 2 are configured to communicate with each other, and data necessary for the control is transmitted from the indoor units $1a$ to $1d$ to the outdoor unit 2. The remote controller $3a$ is configured to communicate with the indoor units $1a$ and $1b$ in the group $10a$, and data necessary for the control is transmitted from the remote controller $3a$ to the indoor units $1a$ and $1b$. Likewise, the remote controller $3b$ is configured to communicate with the indoor units $1c$ and $1d$ in the group $10b$, and data necessary for the control is transmitted from the remote controller $3b$ to the indoor units $1c$ and $1d$.

Before proceeding to the configuration of the indoor unit 1, the outdoor unit 2, and the remote controller 3, the outline of the remote controller power supply method according to the present invention will be described. In the air-conditioning apparatus shown in FIG. 1, the power supply to the remote controllers $3a$ and $3b$ is performed by the indoor units $1a$ and $1c$ respectively, each of which has an address of a lowest number among the indoor units 1 in each groups $10a$ and $10b$. The outdoor unit 2 checks the address of all the indoor units $1a$ to $1d$ connected thereto via the signal line 4 and identifies the outdoor units $1a$ and $1c$ having the address of the lowest number in the groups $10a$ and $10b$, respectively, and then instructs the outdoor units $1a$ and $1c$ to supply power to the remote controllers.

First, the configuration of the indoor units $1a$ to $1d$ will be described. The indoor units $1a$ to $1d$ each include a controller 13, an address allocation unit 14, a remote controller power supply unit 15, a monitor request reception unit 16, a monitor request reception supervision unit 17, and a non-volatile memory 18.

The controller 13, which controls the operation of the indoor unit 1, is constituted of a microcomputer. The address allocation unit 14 is constituted of a dip switch, and is utilized to allocate an address to each of the indoor units. The remote controller power supply unit 15 supplies power to the remote controller 3. The monitor request reception unit 16 receives a control data monitor request transmitted from the remote controller 3. The monitor request reception supervision unit 17 monitors whether any other indoor units connected via the same signal line has received the control data monitor request from the remote controller. The non-volatile memory 18 stores the control data.

The respective addresses of the indoor units $1a$ to $1d$ are specified by sequentially allocating a number to the indoor units such that, in Embodiment 1, the address of the indoor unit $1a$ is set to 01, the address of the indoor unit $1b$ is set to 02, the address of the indoor unit $1c$ is set to 03, and the address of the indoor unit $1d$ is set to 04.

Although the address is allocated in ascending order in Embodiment 1, different methods may be adopted. A ranking may be set up according to a predetermined rule, so as to allocate the address according to the ranking. Although the dip switch is employed in Embodiment 1 to set the address of each of the indoor units, different methods may be adopted to set the address.

The configuration of the outdoor unit 2 will now be described. The outdoor unit 2 includes a controller 21, a remote controller power supply instruction unit 22, a monitor request reception confirmation unit 23, a remote controller power supply supervision unit 24, an indoor unit address detection unit 25, and a non-volatile memory 26.

The controller 21, which controls the operation of the outdoor unit 2, is constituted of a microcomputer. The remote controller power supply instruction unit 22 issues an instruction to supply power to the indoor unit 1. The monitor request reception confirmation unit 23 checks whether the indoor unit 1 has received the control data monitor request transmitted from the remote controller 3. The remote controller power supply supervision unit 24 monitors whether the indoor unit 1 is supplying power to the remote controller. The indoor unit address detection unit 25 detects the address of the indoor unit 1 connected via the signal line 4. The non-volatile memory 26 stores the control data.

Hereunder, the configuration of the remote controller 3 will be described. The remote controller 3 includes a controller 31, a monitor request transmission unit 32, a remote controller power supply detection unit 33, operation buttons 34, and a displayer 35.

The controller 31, which controls the operation of the remote controller 3, is constituted of a microcomputer. The monitor request transmission unit 32 makes a request for the control data, for example the operation status, to each of the indoor units 1. The remote controller power supply detection unit 33 detects whether power is being supplied from the indoor unit 1. The operation buttons 34 are utilized, for example, to switch the operation mode of the air-conditioning apparatus. The displayer 35 serves to display the control items of the air-conditioning apparatus.

Although the four indoor units $1a$ to $1d$ are grouped into two groups $10a$ and $10b$ in the air-conditioning apparatus according to Embodiment 1, the number of indoor units and the number of groups are not specifically limited. The number of indoor units and groups may be increased or decreased depending on the size and the number of rooms in which the air-conditioning apparatus is to be installed.

Figure 2:
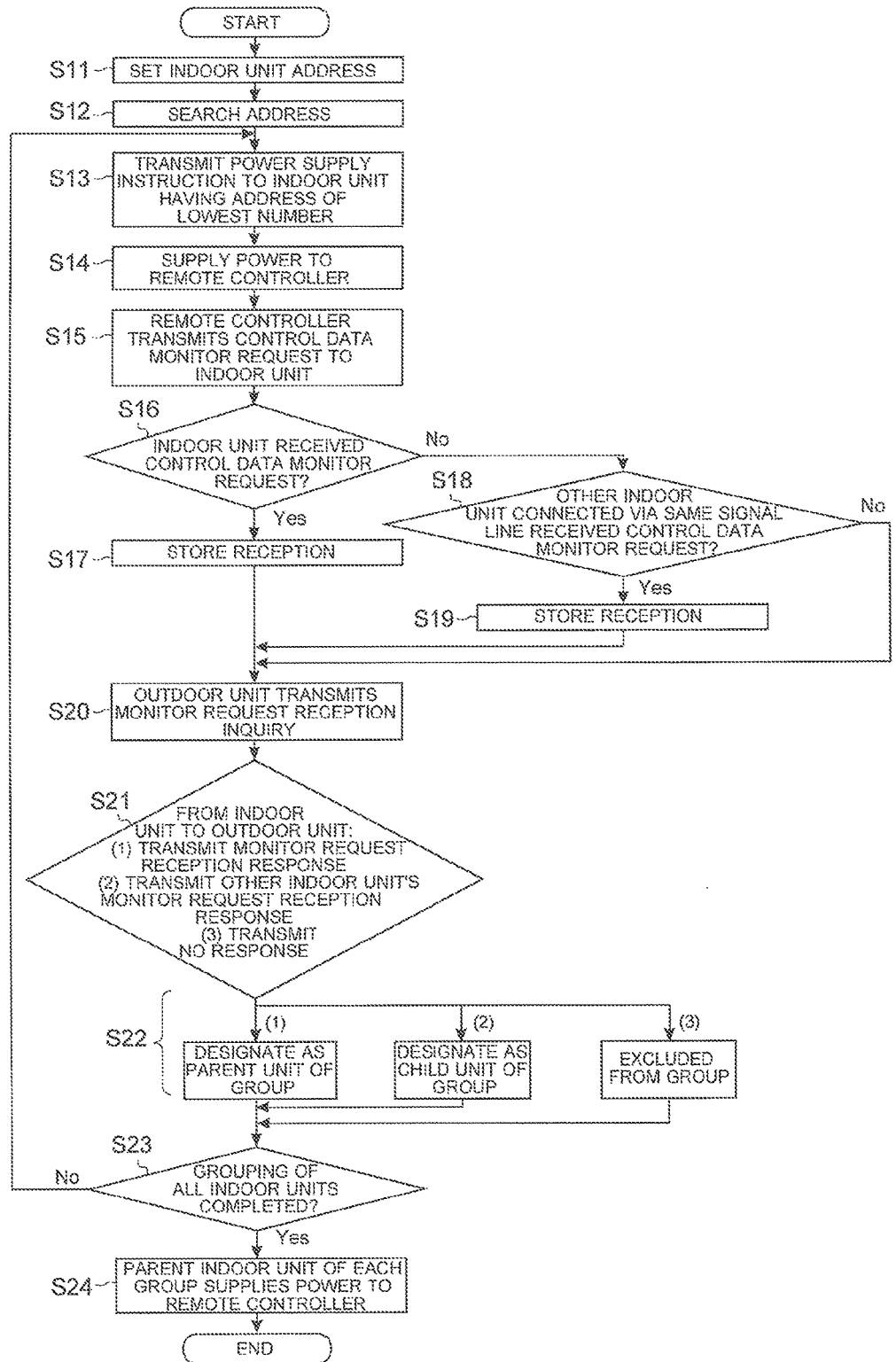
FIG. 2 is a flowchart for explaining a remote controller power supply method according to Embodiment 1 of the present invention.

Referring now to the flowchart of FIG. 2, the remote controller power supply method according to Embodiment 1 will be described.

The outline of the remote controller power supply method according to Embodiment 1 is as follows. At the time of installation of the air-conditioning apparatus, the outdoor unit 2 checks how the indoor units 1 are grouped, and the respective addresses of the indoor units $1a$ to $1d$ included in the groups $10a$ and $10b$. Then the outdoor unit 2 identifies the outdoor unit having the address of the lowest number in each group (in this case, $1a$ and $1c$), and instructs the outdoor units $1a$ and $1c$ to supply power to the remote controllers $3a$ and $3b$, respectively. Hereunder, the details of the instruction to supply power to the remote controller will be described with reference to the flowchart.

When setting up the indoor unit 1, the user allocates the address using the address allocation unit 14 provided in the indoor unit 1 (step S11). More specifically, the user manipulates the dip switch to specify the address of each indoor unit according to a predetermined rule. As mentioned above, the addresses of the indoor units 1a to 1d are set to 01 to 04, respectively.

The outdoor unit 2 then checks the address of all the indoor units 1 for each of which the address has been allocated, via the signal line 4 (step S12). More specifically, the outdoor unit 2 transmits an own address request from the indoor unit address detection unit 25 of the outdoor unit 2 to the indoor units 1a to 1d, in order to detect the address of all the indoor units connected via the signal line 4. Upon receipt of the own address request from the outdoor unit 2, the indoor units 1a to 1d each return an own address response to the outdoor unit 2, so that the outdoor unit 2 acquires the respective addresses of the indoor units 1a to 1d and finishes the address detection.

Upon completing the address detection of the outdoor unit 1, the remote controller power supply instruction unit 22 of the outdoor unit 2 transmits a remote controller power supply instruction to the indoor unit 1a which has the lowest number among the detected addresses (step S13). Upon receipt of the remote controller power supply instruction, the indoor unit 1a causes the remote controller power supply unit 15 to supply power to the remote controller 3a (step S14).

The remote controller 3a which is receiving the power supply transmits a control data monitor request from the monitor request transmission unit 32 to the indoor units 1a and 1b, in order to display the control data such as the operation status of the air-conditioning apparatus, on the displayer 35 (step S15).

Upon receipt of the control data monitor request through the monitor request reception unit 16 (Yes at step S16), the indoor unit 1a having the address of the lowest number stores information to the effect that the request has been received, in the non-volatile memory 18 (step S17).

At the same time, the indoor unit 1b causes the monitor request reception supervision unit 17 to monitor whether other indoor units connected via the same signal line (in this case, indoor unit 1a) have received the control data monitor request, and upon confirming such reception (Yes at step S18) the indoor unit 1b stores information to the effect that the indoor unit 1a has received the request, in the non-volatile memory 18 (step S19).

The outdoor unit 2 transmits a monitor request reception inquiry from the monitor request reception confirmation unit 23 to all the indoor units 1a to 1d connected via the signal line 4 a predetermined time after the transmission of the power supply instruction to the indoor unit 1a having the address of the lowest number, to check whether the indoor units 1 have received the control data monitor request from the remote controller 3 (step S20).

The indoor unit 1a, the non-volatile memory 18 of which retains the information that the control data monitor request has been received, transmits a monitor request reception response to the outdoor unit 2. The indoor unit 1b, the non-volatile memory 18 of which retains the information provided by the monitor request reception supervision unit 17 that the other indoor unit 1a connected via the same signal line 5a has received the control data monitor request, transmits a response indicating other indoor unit's reception of monitor request, to the outdoor unit 2 (step S21).

The outdoor unit 2 then determines that the indoor units 1a and 1b which have responded to the monitor request reception inquiry are in the same group, and stores such information in the non-volatile memory 26. At this point, the outdoor unit 2 stores, in the non-volatile memory 26, information to the effect that the indoor unit 1a, which has transmitted the monitor request reception response, is designated as parent unit that supplies power to the remote controller 3, and that the indoor unit 1b, which has transmitted the response of other indoor unit's reception of monitor request is designated as child unit that follows the control operation of the parent unit without supplying power to the remote controller (step S22).

Then the remote controller power supply instruction unit 22 of the outdoor unit 2 again transmits the power supply instruction to the indoor unit 1c having the address of the lowest number between the indoor units 1c and 1d remained after excluding the indoor units 1a and 1b belonging to the different group. The outdoor unit 2 repeats the mentioned operation until the grouping of all the indoor units connected via the signal line 4 is determined (step S23).

Upon completion of the grouping of all the indoor units 1a to 1d, the outdoor unit 2 transmits the remote controller power supply instruction to the parent indoor unit of each group (in this case, 1a and l c). The parent indoor units 1a and 1c which have received the remote controller power supply instruction respectively supply power to the remote controllers 3a and 3b from the remote controller power supply unit 15, and at this point the setting up of the remote controllers 3a and 3b connected to the respective groups is completed (step S24).

As described above, in Embodiment 1 the outdoor unit 2 recognizes the grouping status of the indoor units 1 by making inquiries to the indoor units 1, and the outdoor unit 2 instructs the indoor unit 1 having the address of the lowest number in each group to supply power to the remote controller 3, on the basis of the result of the inquiries. Such an arrangement eliminates the need to provide a power supply detection circuit in the indoor unit, thereby enabling reduction in manufacturing cost of the air-conditioning apparatus.

Embodiment 2

Embodiment 2 represents a method to continue the power supply to the remote controller by switching the indoor unit that serves as power source, in the case where the parent indoor unit of the group has failed and can no longer supply power to the remote controller.

Figure 3:
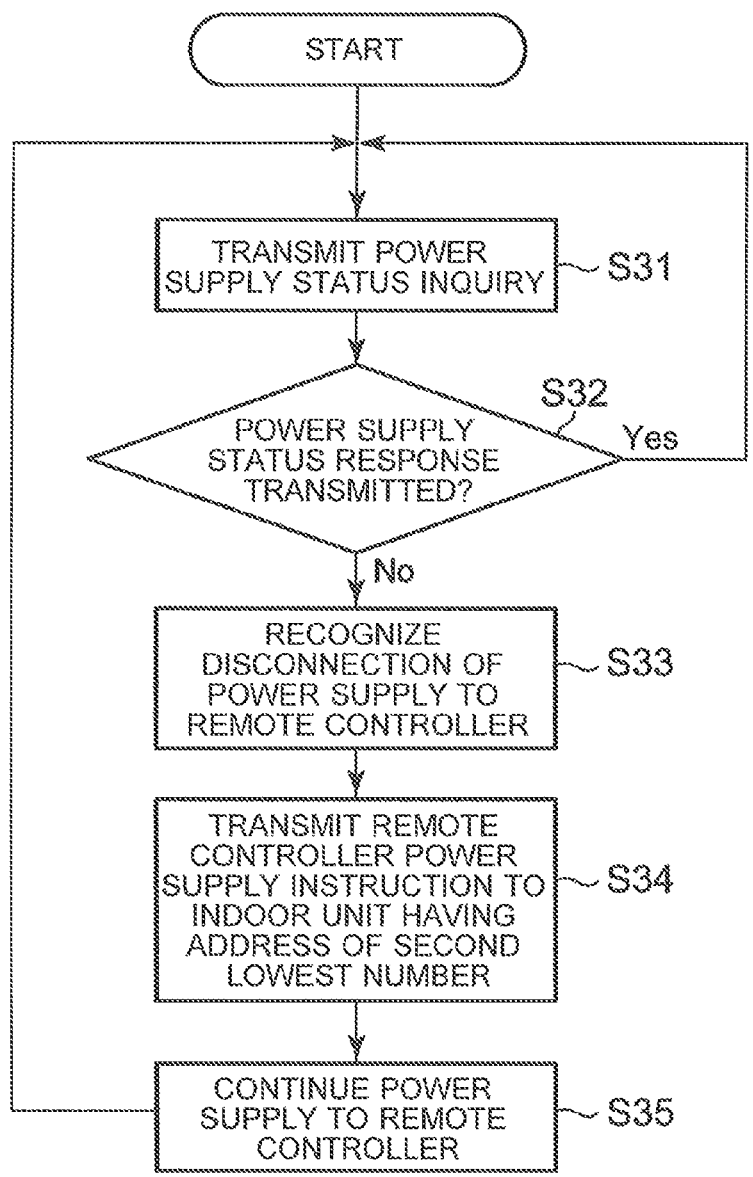
FIG. 3 is a flowchart for explaining a remote controller power supply method according to Embodiment 2 of the present invention.

FIG. 3 is a flowchart for explaining a remote controller power supply method according to Embodiment 2. The remote controller power supply supervision unit 24 of the outdoor unit 2 periodically transmits a power supply status inquiry to the parent indoor units (in this case, 1a and 1c), to thereby monitor the power supply status from the parent indoor units to the respective remote controllers 3 (step S31).

The parent indoor unit 1a or 1c transmits a power supply status response to the outdoor unit, as long as the power supply to the remote controller 3a or 3b is maintained. In case that the power supply from the parent indoor unit is discontinued, the power supply status response is no longer transmitted to the outdoor unit 2 (No at step S32), and hence the outdoor unit 2 recognizes that the power supply from the parent indoor unit 1a or 1c to the remote controller 3a or 3b has been discontinued (step S33).

The outdoor unit 2 retains the addresses of the indoor units 1a to 1d in the groups 10a and 10b, in the non-volatile memory 26. The outdoor unit 2 retrieves the addresses of the indoor units 1a to 1d from the non-volatile memory 26, and identifies the indoor unit having the address of a second lowest number next to the parent unit (in this case, 1b or 1d) in the group 10a or 10b, in whichever the power supply to the remote controller has been discontinued, in order to continue with the power supply to the remote controller 3a or 3b. Then the outdoor unit 2 transmits, from the remote controller power supply instruction unit 22, the remote controller power supply instruction to the indoor unit 1b or 1d (step S34).

Upon receipt of the remote controller power supply instruction, the indoor unit 1b or 1d supplies power to the remote controller 3a or 3b through the remote controller power supply unit 15, to thereby continue the power supply to the remote controller 3a or 3b (step S35).

As described above, even when the parent indoor unit 1a or 1c has failed and can no longer supply power to the remote controller 3a or 3b, the power source is switched to the normal indoor unit 1b or 1d having the address of the second lowest number next to the parent unit in the group 10a or 10b, and thus the power supply to the remote controller 3a or 3b can be continued.

Further, when the outdoor unit 2 transmits, in view of the discontinuation of the power supply status response from the parent indoor unit 1a or 1c, the remote controller power supply instruction to the indoor unit 1b or 1d having the address of the second lowest number next to the parent indoor unit, the outdoor unit 2 transmits at the same time the information that the parent indoor unit can no longer supply power, to the remote controller 3a or 3b through the indoor unit 1b or 1d, and causes the remote controller 3a or 3b to display the information to the effect that the remote controller power supply unit 15 of the parent indoor unit has failed, on the displayer 35. Such an arrangement allows the user of the air-conditioning apparatus to recognize that the remote controller power supply unit of the parent indoor unit is out of order.

REFERENCE SIGNS LIST 1a to 1d: indoor unit, 2: outdoor unit, 3a, 3b: remote controller, 4, 5a, 5b: signal line, 10a, 10b: group, 13, 21, 31: controller, 14: address allocation unit, 15: remote controller power supply unit, 16: monitor request reception unit, 17: monitor request reception supervision unit, 18, 26: non-volatile memory, 22: remote controller power supply instruction unit, 23: monitor request reception confirmation unit, 24: remote controller power supply supervision unit, 25: indoor unit address detection unit, 32: monitor request transmission unit, 33: remote controller power supply detection unit, 34: operation button, 35: displayer

The invention claimed is:
1. An air-conditioning apparatus comprising:
an outdoor unit;
a plurality of indoor units connected to the outdoor unit via a first signal line; and
at least one remote controller connected to the plurality of indoor units via a second signal line, the second signal line being separate from the first signal line,
wherein the plurality of indoor units each include a remote controller power supply unit configured to supply power to the at least one remote controller,
the plurality of indoor units are each allocated with an address having a ranking given according to a predetermined rule, and
the outdoor unit instructs an indoor unit having an address ranked according to the predetermined rule, out of the plurality of indoor units, to supply power to the at least one remote controller.

2. The air-conditioning apparatus of claim 1,
wherein each indoor unit includes:
a controller configured to control an operation of a respective indoor unit,
an address allocation unit configured to set an address,
a monitor request reception unit configured to receive a control data monitor request signal transmitted from the at least one remote controller,
a monitor request reception supervision unit configured to monitor whether another indoor unit connected via the same signal line has received the control data monitor request signal from the at least one remote controller, and
a first non-volatile memory configured to store control data;
the outdoor unit includes:
a controller configured to control an operation of the outdoor unit,
a remote controller power supply instruction unit configured to instruct an indoor unit to supply power,
a monitor request reception confirmation unit configured to check whether the indoor unit has received the control data monitor request transmitted from the at least one remote controller,
an indoor unit address detection unit configured to detect the address of the indoor unit connected via the signal line, and
a second non-volatile memory configured to store control data; and
the at least one remote controller includes:
a controller configured to control an operation of the at least one remote controller,
a remote controller power supply detection unit configured to detect power supply from the indoor unit, and
a monitor request transmission unit configured to request the indoor unit to provide the control data.

3. The air-conditioning apparatus of claim 1,
wherein a plurality of remote controllers are included,
the plurality of indoor units are divided into two or more groups, and one or more of the indoor units in each of the groups are connected to a different remote controller,
the outdoor unit instructs the indoor unit having the address ranked according to the predetermined rule, out of the plurality of indoor units in each of the groups, to supply power to the at least one remote controller.

4. A remote controller power supply method for an air-conditioning apparatus including an outdoor unit, a plurality of indoor units connected to the outdoor unit via a first signal line, and at least one remote controller connected to the plurality of indoor units via a second signal line, the second signal line being separate from the first signal line,
the plurality of indoor units each including a remote controller power supply unit configured to supply power to the at least one remote controller and being divided into two or more groups, and one or more of the plurality of indoor units in each of the groups being connected to a different remote controller,
the remote controller power supply method comprising:

allocating an address having a ranking given according to a predetermined rule to each of the plurality of indoor units; and causing the outdoor unit to instruct an indoor unit having an address ranked according to the predetermined rule, out of the plurality of indoor units in each of the groups, to supply power to the at least one remote controller.

5. The remote controller power supply method of claim 4, wherein the outdoor unit requests all the plurality of indoor units to return an own address, selects the indoor unit having the address ranked according to the predetermined rule, out of the indoor units of each of the groups, on a basis of the address returned from the plurality of indoor units, and instructs the selected indoor unit to supply power to the at least one remote controller.

6. The remote controller power supply method of claim 4, wherein the outdoor unit periodically inquires the indoor unit having the address ranked according to the predetermined rule about a power supply status to the at least one remote controller, and instructs an indoor unit having an address ranked next according to the predetermined rule in the same group to supply power to the at least one remote controller, when a response from the indoor unit having the address ranked accord to the predetermined rule is discontinued.

7. The remote controller power supply method of claim 6, wherein the outdoor unit notifies the at least one remote controller through the indoor unit having the address ranked next according to the predetermined rule, when instructing a second indoor unit to supply power to the at least one remote controller, that the indoor unit having the address ranked according to the predetermined rule is no longer able to supply power to the at least one remote controller, and the at least one remote controller displays on a displayer, upon receipt of the notification, an indication that the indoor unit having the address ranked according to the predetermined rule is out of order.

* * * * *